Dec. 5, 1939.     A. F. KENYON     2,182,630
POWER DISTRIBUTION SYSTEM
Filed Aug. 28, 1937
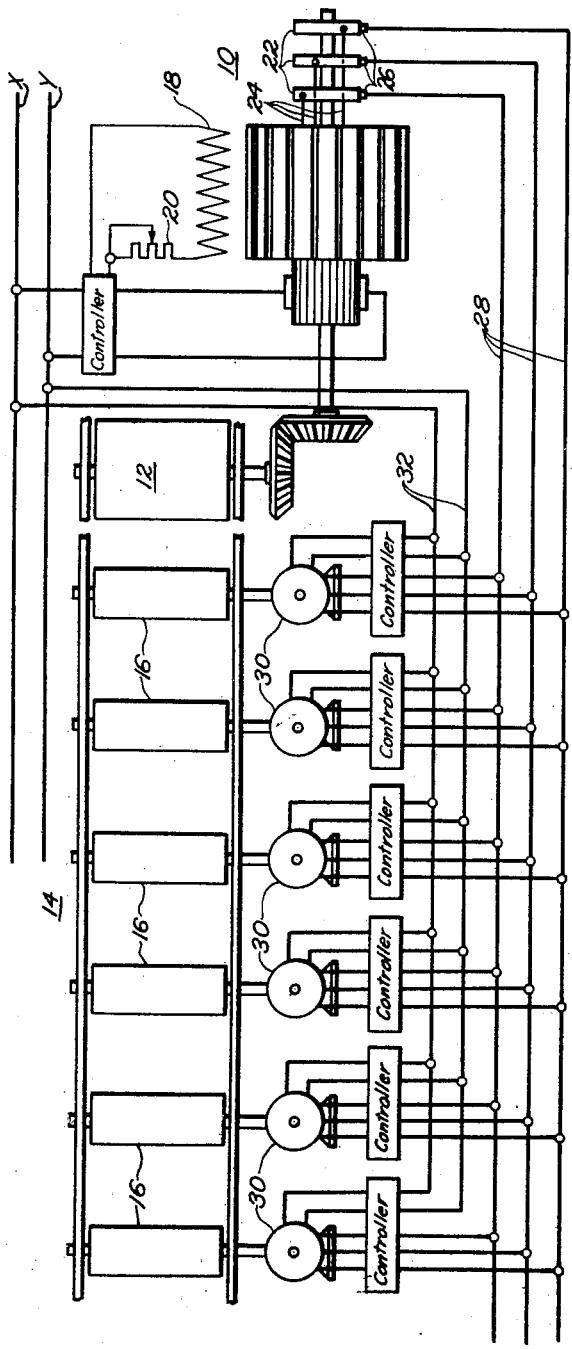
WITNESSES:
INVENTOR
Alonzo F. Kenyon.
ATTORNEY Patented Dec. 5, 1939

2,182,630

UNITED STATES PATENT OFFICE 2,182,630

POWER DISTRIBUTION SYSTEM

Alonzo F. Kenyon, Wilkinsburg, Pa., assignor to Westinghouse Electric & Manufacturing Company, East Pittsburgh, Pa., a corporation of Pennsylvania Application August 28, 1937, Serial No. 161,441

2 Claims. (Cl. 80—31.1)

My invention relates, generally, to power distribution systems and, more particularly, to a system for causing one or more small motors to operate at speeds exactly or approximately proportional to the speed of a larger variable speed direct-current motor.

In carrying out a number of industrial operations, it is necessary that the speed of operation of certain mechanisms in the process be proportional to the speed of operation of other mechanisms in order to provide a smooth and uninterrupted flow of the material being worked upon through the several steps of the process. Examples of such cooperating mechanisms are the reducing rolls and the run-out table rollers in a steel rolling mill, and the several rolls of a calender stack in paper making machines and preceding sections of the machine.

An object of my invention is to provide a system which shall function to maintain one or more small motors in exact or approximate synchronism with a larger direct-current motor.

Another object of the invention is to provide a control system which shall function to cause one or more moving parts of a machine to operate at a speed which is proportional to the speed of another part of the machine without any mechanical connection between the parts of the machine.

These and other objects and advantages of the invention will be apparent from the accompanying detailed description taken in connection with the single figure of the drawing, in which there are shown diagrammatically the relations of the elements comprising the invention as applied to the control of the table roll motors of a steel rolling mill to maintain proportionate speeds between the table rolls and the reducing rolls.

In carrying out the invention the armature windings of a direct-current motor are tapped to provide alternating current for driving alternating-current motors at speeds which it is desired shall vary with the speed of the direct-current motor.

Referring to the drawing, a direct-current motor 10 is mechanically connected to drive a reducing roll stand 12 of a steel rolling mill. A run-out table 14 comprising a series of rollers 16 is provided for conveying the rolled material from the reducing roll stand 12.

The motor 10 is energized through its controller from the source of direct-current power indicated by conductors X and Y, and has a main field winding 18 which may be variably energized under control of the rheostat 20 to vary the speed of the motor 10.

On the shaft of the motor 10 there are provided slip rings 22, each of which is connected by means of conductors 24 to the windings of the armature of motor 10 in such a manner as to produce alternating-current potential on the slip rings 22. Connections are made from the slip rings 22 by means of brushes 26 and conductors 28 through suitable controllers to a group of motors 30, each of which is mechanically connected to drive one of the run-out table rollers 16. These motors are preferably synchronous motors and receive energization for their direct-current field windings from the source of direct-current power X, Y through conductors 32. Such a number of motors 30 and rollers 16 may be provided as is necessary to provide the desired length of run-out table.

In the operation of the device, while the motor 10 is energized from the source of direct-current supply X, Y, and is driving the reducing roll, alternating current is being supplied from the windings of the armature of the motor through conductors 24, slip rings 22, brushes 26 and conductors 28 to the synchronous motors 30. Since the frequency of the alternating current which is flowing in the windings of the armature, varies directly with the speed of the armature, it will be seen that the synchronous motors 30 will be rotating at a speed which is directly proportional to the speed of the armature of motor 10, and the ratio of the speeds of motors 30 and motor 10 will be determined by the relative number of poles on the two motors.

While I have shown the system of my invention as it is applied to the operation of the reducing roll stand of a rolling mill and its associated run-out table rolls, it will be apparent that the system may be used to produce proportionate speeds between any two elements of a mechanism where it is necessary that the speeds of such elements bear a fixed relation to one another.

In the event that only approximate proportionate speed is necessary between such elements as the reducing roll stand 12 and the table rollers 16 shown in the drawing, the motors 30 may be alternating-current motors of another type such as induction motors. If induction motors are used in place of the synchronous motors shown, the variation for exact relation of speed between the motor 10 and the induction motors would be only that caused by the normal slip of the induction motors.

It will be seen that I have provided a simple and effective system for maintaining the speed of one or more relatively small motors exactly or approximately proportionate to the speed of a larger direct-current motor.

In compliance with the requirements of the patent statutes, I have shown and described herein a preferred embodiment of my invention. It is understood, however, that the invention is not limited to the precise construction shown and described but is capable of modification by one skilled in the art, the embodiment herein shown being merely illustrative of the principles of my invention.

I claim as my invention:

1. In a system for maintaining a predetermined speed relation between the run-out table rollers and the reducing rolls of a steel mill, a direct-current motor for driving the reducing rolls, a synchronous motor for driving the table rollers, and means for tapping the armature of said direct-current motor to provide alternating current for energizing said synchronous motor.

2. In a work device, a plurality of rotatable elements which simultaneously engage a work piece as the work piece moves through the work device, and means for producing equal values of peripheral speeds of said rotatable elements comprising a direct-current motor connected in driving relation with one of said rotatable elements, a synchronous motor connected in driving relation with each of the other of said rotatable elements, and means for utilizing the alternating current flowing in the armature windings of said direct-current motor for driving said synchronous motors.

ALONZO F. KENYON.